United States Patent
Schafmeister (10) Patent No.: US 12,322,994 B2
(45) Date of Patent: Jun. 3, 2025

(54) APPARATUS AND METHOD FOR CHARGING AN ELECTRIC BATTERY VEHICLE

(71) Applicant: Universitaet Paderborn, Paderborn (DE)

(72) Inventor: Frank Schafmeister, Warburg (DE)

(73) Assignee: Universitaet Paderborn, Paderborn (DE)

( * ) Notice: Subject to any disclaimer, the term of this patent is extended or adjusted under 35 U.S.C. 154(b) by 768 days.

(21) Appl. No.: 17/612,001

(22) PCT Filed: May 6, 2020

(86) PCT No.: PCT/DE2020/100377
§ 371 (c)(1),
(2) Date: Nov. 17, 2021

(87) PCT Pub. No.: WO2020/233741
PCT Pub. Date: Nov. 26, 2020

(65) Prior Publication Data
US 2022/0227242 A1    Jul. 21, 2022

(30) Foreign Application Priority Data

May 23, 2019   (DE) .................... 10 2019 113 729.2
Nov. 5, 2019    (DE) .................... 10 2019 129 754.0

(51) Int. Cl.
*H02J 7/02*   (2016.01)
*B60L 53/10*  (2019.01)
(Continued)

(52) U.S. Cl.
CPC .............. *H02J 7/02* (2013.01); *B60L 53/11* (2019.02); *H02M 1/4216* (2013.01);
(Continued)

(58) Field of Classification Search
CPC .. H02J 7/02; H02J 3/01; H02J 2207/20; H02J 2310/48; B60L 53/11; H02M 1/4216;
(Continued)

(56) References Cited

U.S. PATENT DOCUMENTS

| | | | |
|---|---|---|---|
| 9,018,792 B2* | 4/2015 | Still ........................ | B60L 1/003 318/362 |
| 9,556,789 B2* | 1/2017 | Geradts ..................... | B60L 7/14 |
| 9,893,644 B1 | 2/2018 | Ahladas et al. | |
| 10,123,450 B2* | 11/2018 | Sarti ........................ | H02M 7/06 |

(Continued)

FOREIGN PATENT DOCUMENTS

| | | | | |
|---|---|---|---|---|
| CN | 1664605 A | * | 9/2005 | ............. G01R 31/02 |
| CN | 100359792 C | | 1/2008 | |

(Continued)

OTHER PUBLICATIONS

CN100359792C (Machine Translation) (Year: 2008) Method for detecting broken line fault between rectifier zero line of uninterrupted power source and electrified wire netting zero line Machine Translation of CN100359792C to Yang et al., (Yang) (Year: 2008).*

(Continued)

*Primary Examiner* — M'Baye Diao
(74) *Attorney, Agent, or Firm* — Stephan A. Pendorf; Patent Central LLC (57) ABSTRACT

An apparatus for charging a (fully) electric battery vehicle with a direct current, having a rectifier connected to a multiphase power supply system, having an intermediate circuit which is arranged on the charging side of the rectifier and is coupled to the latter and has a number of capacitances and a centre point, having a DC/DC converter which is arranged on the charging side of the intermediate circuit and is coupled to the latter and is intended to adapt an intermediate circuit voltage of the intermediate circuit to a charging voltage of a battery of the battery vehicle, wherein the centre (Continued)

point of the intermediate circuit is connected to a neutral conductor of the multiphase power supply system.

19 Claims, 12 Drawing Sheets

(51) Int. Cl.
    *H02M 1/42*         (2007.01)
    *H02M 3/158*       (2006.01)
    *H02M 7/487*       (2007.01)

(52) U.S. Cl.
    CPC ....... *H02M 1/4233* (2013.01); *H02M 3/1582* (2013.01); *H02M 7/487* (2013.01)

(58) Field of Classification Search
    CPC .. H02M 1/4233; H02M 3/1582; H02M 7/487; H02M 1/007; H02M 1/0077; H02M 1/123; H02M 3/156; H02M 3/158; H02M 3/1584; H02M 1/10; Y02B 70/10; Y02T 10/70; Y02T 10/7072; Y02T 90/12; Y02T 90/14
    USPC ........................................................ 320/108
    See application file for complete search history.

(56) References Cited

U.S. PATENT DOCUMENTS

| | | | | |
|---|---|---|---|---|
| 11,290,007 | B2* | 3/2022 | Koerner | H02J 7/02 |
| 11,472,305 | B2* | 10/2022 | Pfeilschifter | H02J 7/02 |
| 11,731,523 | B2* | 8/2023 | Pfeilschifter | H02M 1/10 |
| | | | | 320/109 |
| 11,824,380 | B2* | 11/2023 | Xu | H02M 3/1582 |
| 2009/0268496 | A1 | 10/2009 | Tan et al. | |
| 2014/0211520 | A1* | 7/2014 | Zhang | H02M 1/126 |
| | | | | 363/37 |
| 2017/0279287 | A1* | 9/2017 | Solodovnik | B60L 58/20 |
| 2018/0062525 | A1* | 3/2018 | Radic | H02M 1/08 |

FOREIGN PATENT DOCUMENTS

| | | | |
|---|---|---|---|
| WO | WO-2012019665 A2 * | 2/2012 | ........ B60L 11/1811 |
| WO | 2018126393 A1 | 7/2018 | |

OTHER PUBLICATIONS

International Search Report issued on Jul. 28, 2020, in International Application No. PCT/DE2020/100377.
Notification of Transmittal of Translation of the International Preliminary Report on Patentability with Written Opinion mailed on Dec. 2, 2021, in International Application No. PCT/DE2020/100377.

* cited by examiner

Switching Signals $s_n$ for 2-Level Boost Rectifier

| $s_1 = z_a$ AND $(u_a < 0)$ | $s_3 = z_b$ AND $(u_b < 0)$ | $s_5 = z_c$ AND $(u_c < 0)$ |
|---|---|---|
| $s_2 = z_a$ AND $(u_a > 0)$ | $s_4 = z_b$ AND $(u_b > 0)$ | $s_6 = z_c$ AND $(u_c > 0)$ |

Tab.1: Control signals for two-point topology (bidirectional).

Switching Signals $s_n$ for 3-Level Boost Rectifier

| $s_1 = z_a$ AND $(u_a > 0)$ | $s_3 = z_b$ AND $(u_b > 0)$ | $s_5 = z_c$ AND $(u_c > 0)$ |
|---|---|---|
| $s_1 = \text{NOT}(z_a)$ AND $(u_a < 0)$ | $s_3 = \text{NOT}(z_b)$ AND $(u_b < 0)$ | $s_5 = \text{NOT}(z_c)$ AND $(u_c < 0)$ |

Tab.2: Control signals for three-point topology (unidirectional).

Fig. 6b b) Modular OBC, three-phase

Fig. 7

APPARATUS AND METHOD FOR CHARGING AN ELECTRIC BATTERY VEHICLE

The invention relates to a device for charging a (fully) electric battery vehicle with a direct current, having a rectifier connected to a multiphase power grid, having an intermediate circuit which is arranged on the charging side of the rectifier and is coupled to the latter and has a number of capacitances and a center point, having a DC/DC converter which is arranged on the charging side of the intermediate circuit and is coupled to the latter and is intended to adapt an intermediate circuit voltage of the intermediate circuit to a charging voltage of a battery of the battery vehicle.

The invention further relates to methods for charging a (fully) electric battery vehicle with direct current, that an alternating current or rotary current provided by a multiphase power grid is rectified, wherein a center point of a capacitive intermediate circuit exists, and in that a battery of the (fully) electric battery vehicle is supplied with the rectified alternating current.

In order to promote individual electromobility, especially through (fully) electric battery vehicles (EVs), it is important to increase the effectiveness and the performance of an electric drivetrain of the (fully) electric battery vehicle. In particularly, increased range and simultaneous vehicle cost reduction and shortened charging times at widely accessible infrastructure networks are desired. In this context, chargers or on-board chargers (OBCs) are particularly noteworthy. Such chargers use the alternating current voltage grid which are widely present in public and private spaces and convert the provided alternating current voltage into a direct current voltage in the vehicle to charge the drive battery. In order to shorten the charging times, the transferable power of the charger must be further increased and to this end, in particular three-phasally operated chargers are an option which use all accessible grid phases. Previous chargers, as they are known for example from US 2017/0279287 A1, have, in the direction from the grid toward the battery, a filter, a rectifier, an intermediate circuit, and a DC/DC converter for adjusting the intermediate circuit voltage to a charging voltage of the battery. The DC/DC converter has a transformer for galvanic isolation with which transformer undesired common-mode interferences are decreased.

From WO 2018/126393 A1, a generic device for charging a fully electric battery vehicle is known in which the DC/DC converter, unlike in the aforementioned prior art, has no galvanic isolation. The DC/DC converters are, on the entrance side, each connected to a common direct current distribution bus which is supplied by the rectifier connected to the grid. The intermediate circuit arranged on the rectifier has a center point connection. The rectifier circuit (bidirectional three-point rectifier) presented therein thus provides an additional potential on the exit side. Not only a positive direct current voltage and a negative direct current voltage are provided, but a middle potential (around zero) as well. Preferably, the rectifier can in this way be operated with higher circuit frequencies or with smaller and lighter magnetic components. However, it is additionally desirable to reduce common-mode interferences and to do so with rectifier circuits of low complexity, i.e. with the smallest possible number of drivable switching elements.

It is therefore the object of the present invention to provide a device and a method for charging a (fully) electric battery vehicle such that a relatively high electrical performance is provided quickly and with low common-mode interferences, i.e. essentially common-mode free, through charging circuits of low complexity for charging a battery.

In order to achieve this object, the invention, in combination with the preamble of claim 1, is characterized in that the center point of the intermediate circuit is connected to a neutral conductor of the multiphase power grid.

Advantageously, through the connection of the center point of an intermediate circuit with a neutral conductor of the multiphase power grid, the invention essentially allows for a "common-mode free" operation of rectifiers and DC/DC converters of the charger with simultaneous provision of a relatively high charging current. The common-mode free modulation provided according to the invention allows for a simplified structure of the DC/DC converter circuit without a transformer. The majority of the semiconductor switching elements can also be simplified, i.e. embodied with a lower blocking voltage (600 V instead of 1000 V or 1200 V). In this way, for example, the implementation of the DC/DC converter as a GaN-based buck converter is also made possible. A second advantage is that the filter circuit on the grid side need not be enlarged, as would typically be necessary when the transformer is omitted. In particular, the filter circuit can in fact be substantially smaller than in the typical transformer-based charger due to its common-mode free nature. A third advantage arises in that, by introducing the neutral conductor into the intermediate voltage circuit, charging at a single-phase household power outlet is made easily possible in emergencies.

In general, the invention prevents common-mode interferences which would otherwise cause significant (switching frequent) leakage currents.

According to a further development of the invention, a three-phasally operated rectifier circuit is provided as a three-point topology for a unidirectional power flow from a charging station to the battery of the vehicle, said rectifier circuit advantageously having 600 V GaN switching elements as switching elements. In this way, the degree of electrical impact and the structural size or weight of the device can be best optimized for this usage. Advantageously, in a further expansion step, novel monolithically bidirectional 600 V GaN switching elements can be employed. This would require only three drivable switching elements for the rectifier step.

According to a further development of the invention, the rectifier circuit has a two-point topology for a bidirectional power flow between the charging station and the battery of the vehicle. Advantageously, electric power from the vehicle can be transferred into the current grid in order to stabilize the power grid.

According to a further development of the invention, the rectifier circuit is formed as a pulse rectifier with power factor correction. Advantageously, the rectifier circuit is set up to be grid compatible.

According to a further development of the invention, the components of the device according to the invention form a common structural unit which is integrated in the electric battery vehicle. It thus forms a so-called on-board charger (OBC).

In order to achieve this object, the invention, in combination with the preamble of claim 15, is characterized in that the potential of the center point of the intermediate circuit is placed on the potential of a neutral conductor of the multiphase power grid.

The advantage of the method according to the invention is that, through the adjustment of the potential at a center point of a direct current intermediate circuit to the neutral conductor of the multiphase power grid, a compact and common-mode suppressed control of the power flow from the multiphase power grid to a battery and vice versa can be ensured in a simple manner.

According to a further development of the invention, circuit components of the rectifier and/or of the DC/DC converter are driven such that only a first intermediate circuit partial voltage is switched through to the battery during a positive grid half-cycle and a second intermediate circuit partial voltage is switched through to the battery during a negative grid half-cycle. In this way, an advantageous single phase charging operation is possible which is usable in emergency operation at a single phase household grid or upon phase failure of one or two grid phases. Advantageously, the intermediate circuit capacitances can be selected to be particularly small. In this way, the structural size and the cost of the OCS is reduced on the one hand and, on the other hand, the small capacitances can be realized as film capacitors which are particularly robust and durable. This is in particular relevant for automobile applications.

According to a further development of the invention, a grid phase-independent regulation of the current flowing through the respective grid phase occurs. Each grid phase receives an independent current regulating path so that three independent current regulators, each having their own comparison of target and actual values, are provided. The PWM control signals (PWM: pulse width modulation) of the rectifier circuit preferably have the same frequency and need not be temporally synchronized.

According to a further development of the invention, the regulation of the phase currents takes place depending on a regulation of the intermediate circuit voltage. A cascade regulation occurs for which an exit signal of the intermediate circuit voltage regulator is integrated to determine the current target values.

According to a further development of the invention, the identification of an advantageous driving value for the switching elements of the rectifier circuit is carried out by means of a duty cycle feedforward and a limiter. From this, the duty cycles for the switching elements are hereinafter directly determined.

According to a further development of the invention, the identification of the control signals for driving the switching elements is carried out from a special, switching frequency-variable signal. This signal can, for example, be carried out according to a triangular current modulation (TCM). Through the characteristic current reversal of this modulation method, an advantageous neutral voltage switching of the current elements can be made possible at any time, thus reducing the switching losses. According to the invention, the control signals in the single bridge branches assigned to a single grid phase may advantageously have an uneven frequency due to the connection of the neutral conductor at the center point of the intermediate circuit. Alternatively or additionally, the control signals can be embodied in the sense of a boundary mode of critical conduction mode modulation (BM or CrCM). In this way, an advantageous switch behavior of the switching elements (power transistors) is also made possible. The control signals of the individual bridge branches may in this case also have an uneven frequency. Alternatively or additionally, the control signals can be selected according to a discontinuous conduction mode modulation (DCM), for which they may also have an uneven frequency in the different bridge branches or grid phases. Optionally, an advantageous mixed operation of these different drives can be carried out.

Further advantages of the invention will be apparent from the further dependent claims.

Exemplary embodiments of the invention will be described below in more detail with reference to the drawings.

The device according to the invention for charging a (fully) electric battery vehicle consists of a plurality of circuit components. A rectifier 1 is connected to a multiphase power grid 2. On the grid current side of the rectifier 1, a filter 3 (EMV filter) is preferably provided. On a side of the rectifier 1 which is facing away from the grid or is on the charging side, an intermediate circuit 4 is provided. A DC/DC converter 5 intended to adapt an intermediate circuit voltage $U_{ZK}$ of the intermediate circuit 4 to a charging voltage $U_{Batt}$ of a battery 6 of the battery vehicle is located downstream from the intermediate circuit 4.

The device or circuit arrangement according to the invention is integrated in a charger which is a component of the battery vehicle. The charger forms a structural unit which is installed in the electric battery vehicle as an on-board unit (OBU) or an on-board charger (OBC).

The intermediate circuit 4 in the present exemplary embodiments has two intermediate circuit partial voltages, specifically a first intermediate circuit partial voltage $U_{ZK1}$ falling at a first capacitance $C_1$ and a second intermediate circuit partial voltage $U_{ZK2}$ falling at a second capacitance $C_2$ which is arranged in series to the first capacitance $C_1$. A center point $M_{ZK}$ located between the first capacitance $C_1$ and the second capacitance $C_2$ of the intermediate circuit (4) is directly connected to a neutral conductor N of the multiphase power grid (2) via a line 7.

Figure 1A:
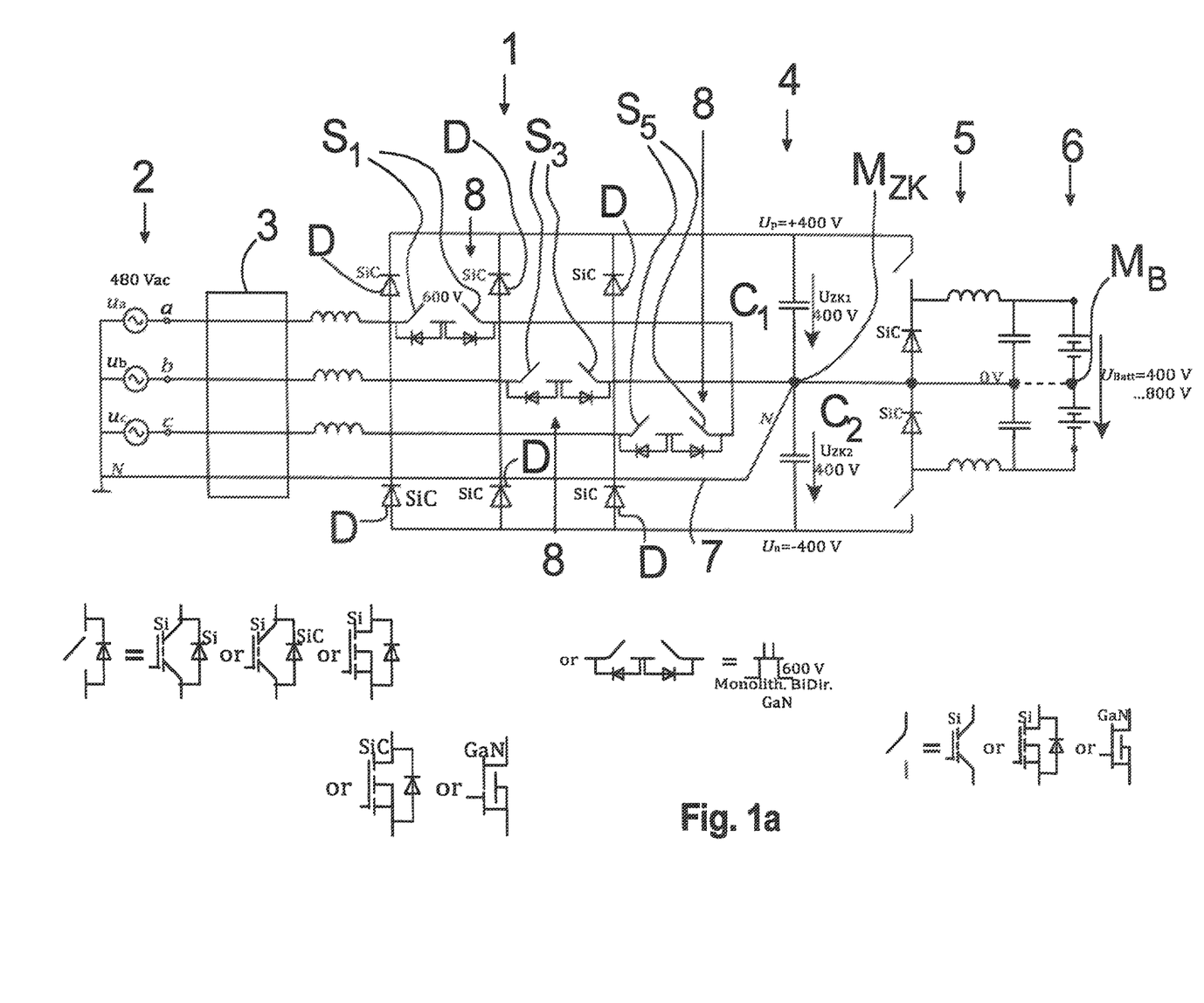
FIG. 1a shows a schematic of a first embodiment of the invention for a unidirectional power flow to a battery based on a common-mode free three-point-circuit.

According to a first embodiment of the invention according to FIG. 1a, the rectifier 1 is formed as a pulse rectifier. The pulse rectifier is formed as a three-phase pulse rectifier which has three bridge branches each having externally arranged diodes (preferably SiC) and switching elements 8 which each connect to the intermediate circuit center point $M_{ZK}$. The circuit arrangement according to FIG. 1a contributes to the unidirectional power flow from the multiphase power grid 2 to the battery 6 in the form of a three-point-circuit. Power transistors of various structural types can be implemented as switching elements 8, as is clarified by the alternatives in the row under the circuit in FIG. 1a. In particular, GaN-based power transistors can be employed. According to FIG. 1a the DC/DC converter 5 is formed as a buck converter for each half direct current intermediate circuit 4.

The buck converter circuits, which preferably use SiC-diodes, thus form a potential-bound DC/DC converter and replace a conventional transformer-based circuit.

Figure 1B:
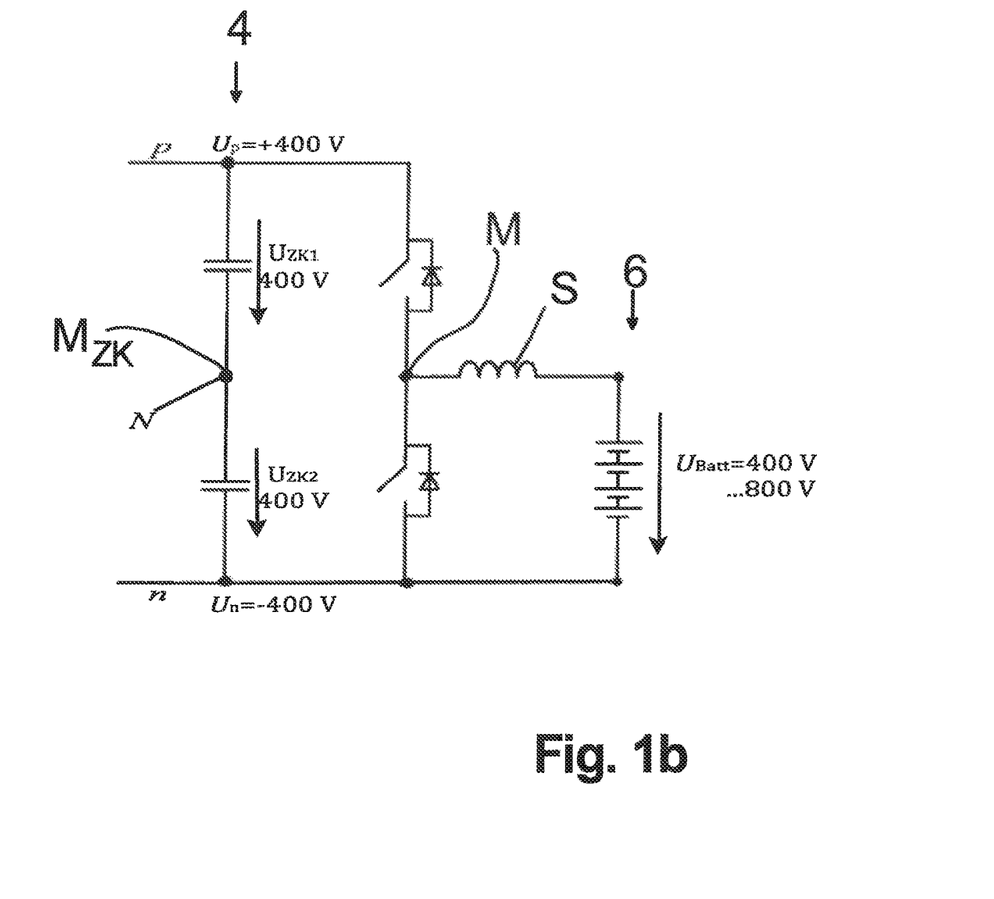
FIG. 1b shows a DC/DC converter circuit according to an alternative embodiment with a bidirectional power flow (1000 V/1200 V switching elements are in this case necessary)

According to an alternative embodiment according to FIG. 1b, the DC/DC converter 5 can also manage a bidirectional power flow and can, to this end, have a half bridge with alternative power semi-conductors which are shown in the row according to FIG. 1a. The DC/DC converter 5 according to FIG. 1b also has one or, in the case of power scaling, several power half-bridge branches which are parallel to the half direct current voltage intermediate circuit 4 and a throttle S connected to the half-bridge center point M. Advantageously, a conventional dipole battery 6 can be connected with, for example, 400 V to 800 V nominal voltage. The switching elements of the DC/DC converter 5 according to FIG. 1b must have a blocking voltage of more than 800 V. Advantageously, transistor switches in SiC technologies can also be implemented. Conversely, the switching elements of the DC/DC converter 5 according to FIG. 1a (or FIG. 1c) must have a blocking voltage of more than 400 V.

Figure 1C:
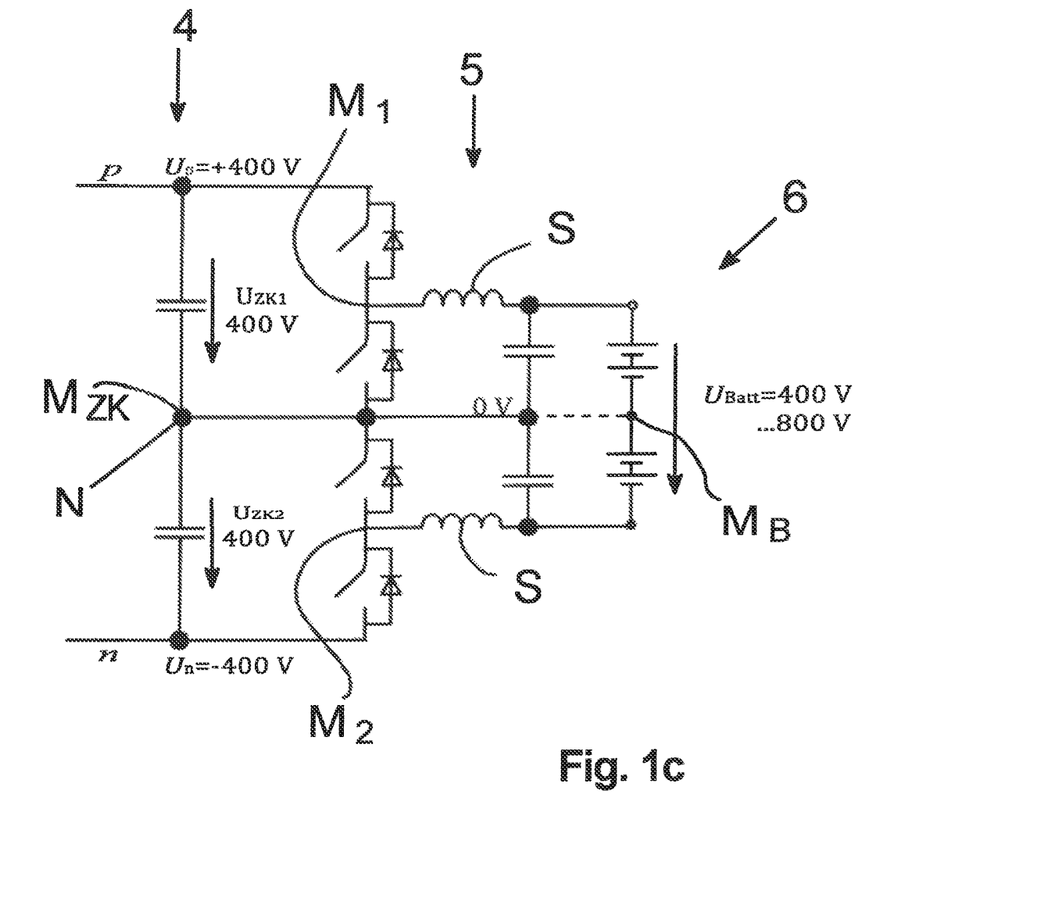
FIG. 1c shows a DC/DC converter circuit according to a further alternative embodiment with a bidirectional power flow for 600 V switching elements (e.g. GaN or Si MosFET may be used in this case)

According to a further alternative embodiment for enabling a bidirectional power flow, the DC/DC converter 5 according to FIG. 1c can also consist of one or, for scaling power, a plurality of power half-bridge branches which are parallel to the half direct current voltage intermediate circuit 4 and a throttle S connected to the respective half-bridge center point $M_1$, $M_2$. Thus, there are two half-bridge branches switched in series which are each connected to the capacitive center point $M_{ZK}$ of the intermediate circuit 4. The power semi-conductors must then only have a blocking voltage of roughly 600 V and can therefore be realized with lower loss types, specifically also with, for example, with GaN HEMT technology in addition to Si MosFET. Advantageously, the battery 6 is in this case connected with a center point connection $M_B$ (tripole), wherein the center point connection $M_B$ can be connected to the neutral conductor N—as drawn-in in FIGS. 1a and 1c—or not. In the second case, the center point port $M_B$ is not connected to the DC/DC converter 5.

Thus, according to the invention, the DC/DC converter 5 can be
formed as a buck converter for a unidirectional power flow or formed as two buck converters connected antiserially for a unidirectional power flow, the respective half-bridge center points $M_1$, $M_2$ of which are each connected to a throttle S and wherein the two buck converters are each connected to the center point $M_{ZK}$ of the intermediate circuit 4 at the diode side, or formed as a transistor/diode half-bridge branch for a bidirectional power flow which is connected in parallel to the intermediate circuit 4 and the half-bridge center point M of which is connected to a throttle S or formed as two transistor/diode half-bridge branches for a bidirectional power flow which are connected in series, the respective half-bridge center points $M_1$, $M_2$) of which are each connected to a throttle S and wherein a connection point of each of the half-bridge branches is connected to the center point $M_{ZK}$ of the intermediate circuit 4.

Figure 2:
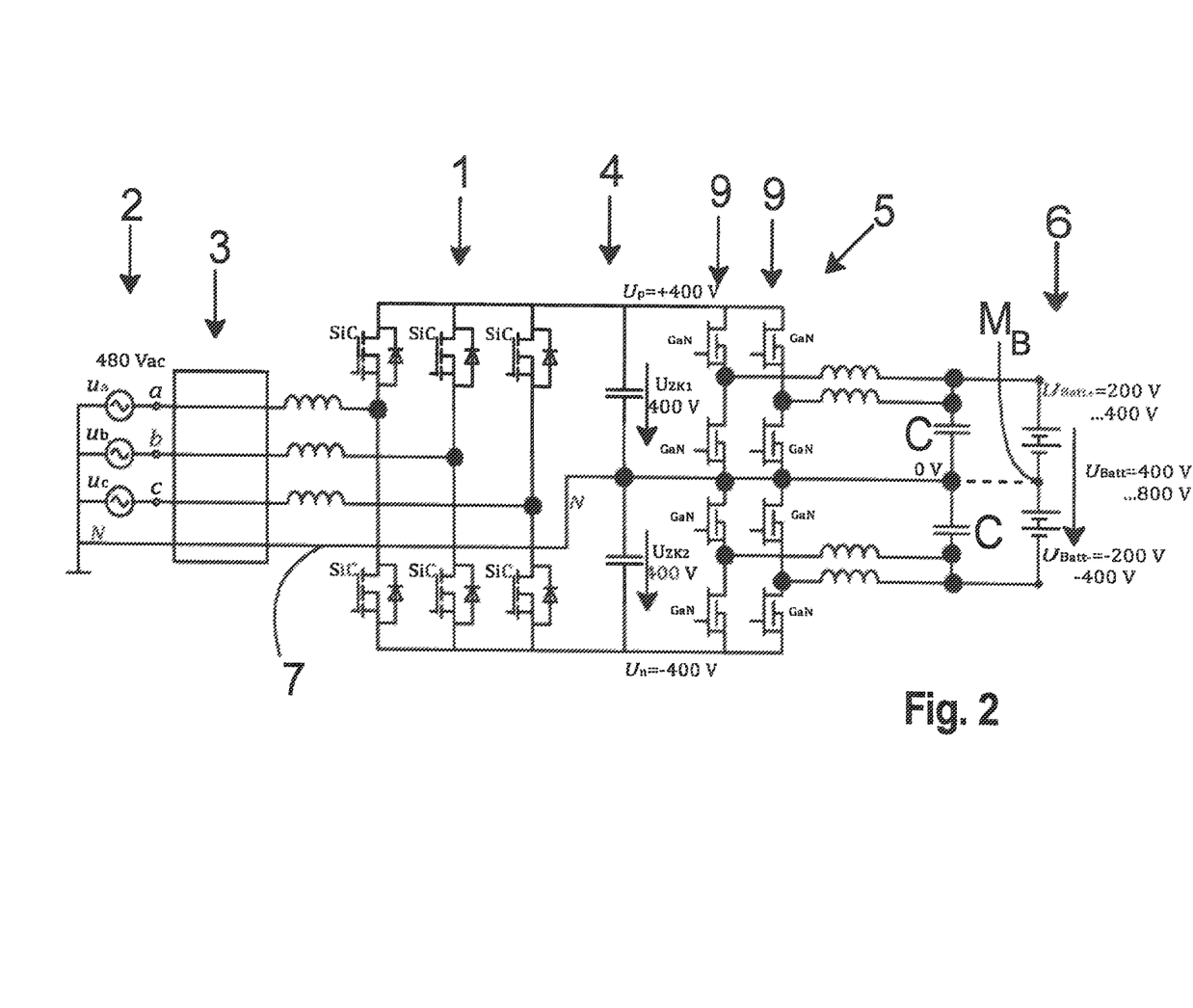
FIG. 2 shows a schematic of a device according to the invention according to a second embodiment (two-point topology) with a bidirectional power flow.

According to a further embodiment of the invention, the rectifier-circuit arrangement for a bidirectional power flow can in particularly, preferably according to FIG. 2, be formed as a two-point-circuit. The associated bidirectional DC/DC converter 5 can in this case be embodied in its fundamental arrangement according to FIG. 1b or according to FIG. 1c. Correspondingly to the power scaling, two or more half-bridge branches 9 may be switched in parallel for each DC/DC converter.

Identical structural parts or structural part functions in the exemplary embodiments are provided with identical reference numerals.

Figure 3:
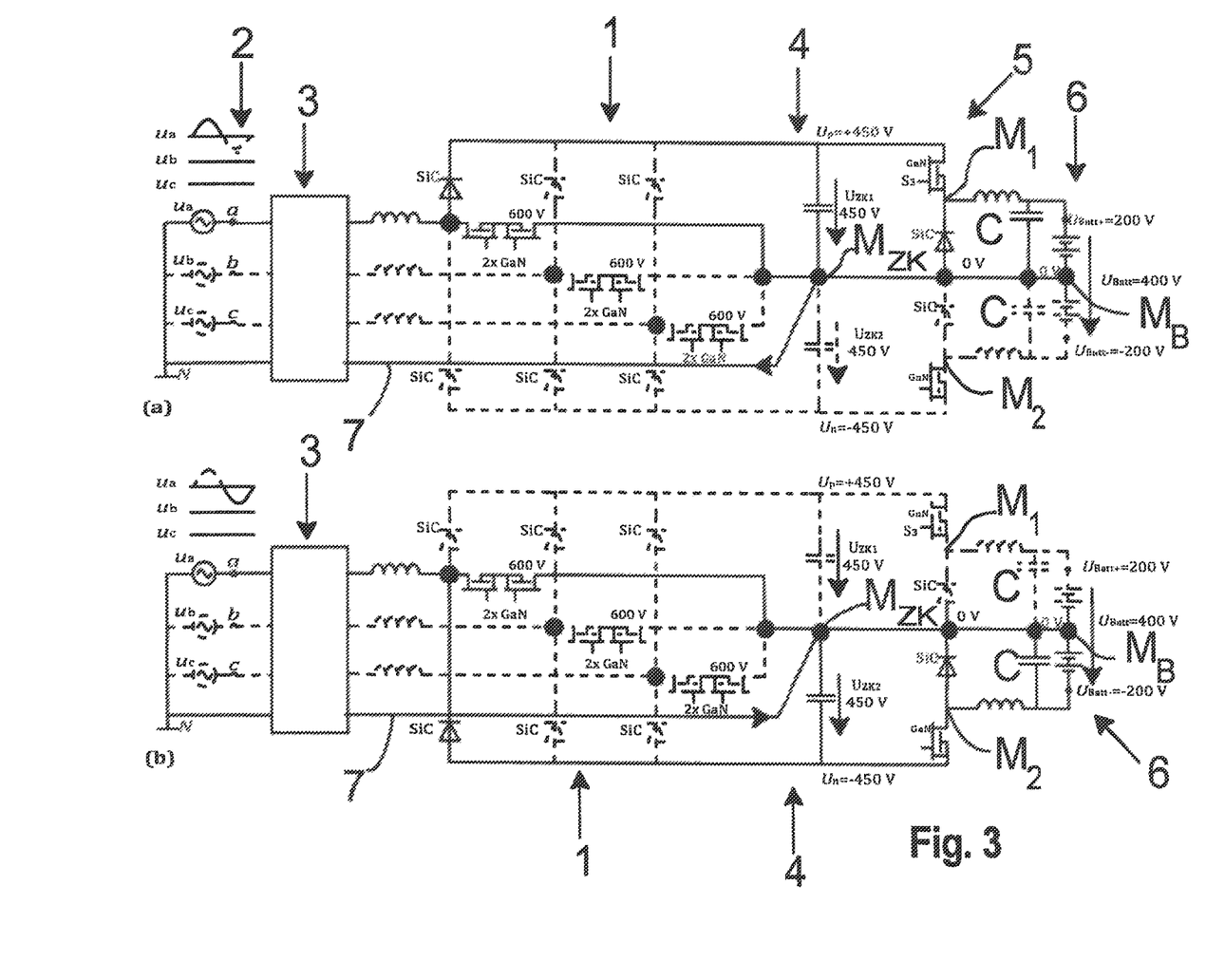
FIG. 3 shows the circuit shown in FIG. 1a in use in single-phase operation, in this case only with the grid phase a, in the two different grid half-cycles, wherein circuit parts shown with broken lines are not active in the single-phase operation.

According to a further embodiment of the invention according to FIG. 3, the battery 6 (driving battery) is—as is optional in the embodiment according to FIG. 1a—connected to the exit of the DC/DC converter 5 with center point connection (tripole). According to FIG. 3, a single-phase charging operation is shown which occurs, for example, when the charger (OBU) is connected to a single-phase household grid or when a phase failure of one or two of the grid phases a, b, c occurs. The driving of the switching elements of this rectifier 1 occurs in such a way that only the half of the direct current voltage intermediate circuit 4 is used for battery charging or battery discharging which is/are being directly charged/discharged by the remaining grid phase/s at the respective point in time. With a unidirectional power flow in which the battery 6 is exclusively charged, a single-phase operation with the grid phase a is assumed by way of example. During the positive grid half-cycle ($u_a>0$), the intermediate circuit partial voltage $U_{ZK1}$ supplied from the grid is exclusively used for charging the battery 6 (black current paths in FIG. 3a). During the negative grid half-cycle ($u_a<0$), the voltage $U_{ZK2}$ then supplied from is exclusively used for battery charging (black current paths in FIG. 3b). In FIG. 3, broken paths each mark inactive circuit parts. It should be noted that the driving of the switching elements according to the embodiment corresponding to the three-point topology shown in FIG. 3 is also fully applicable to the two-point topology according to FIG. 2.

Figure 4:
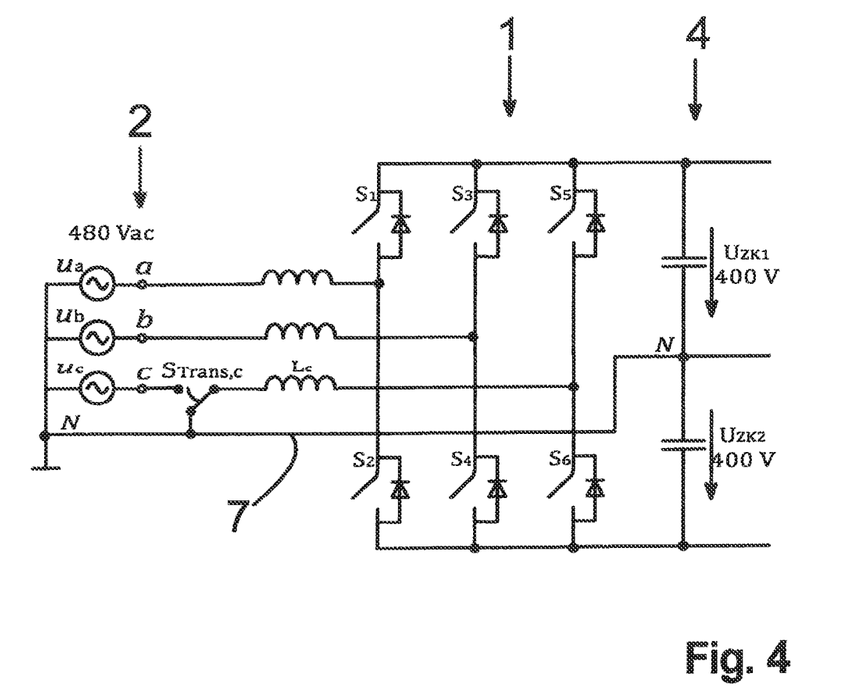
FIG. 4 shows an alternative embodiment of a device with an auxiliary switch for use of the switching elements of a failed grid phase (in this case c) for balancing the intermediate circuit partial voltages upon failure of this grid phase (c).

According to a further embodiment of the invention according to FIG. 4, an auxiliary switch $S_{Trans,c}$ can be provided which separates a boost throttle $L_C$ in the stand c from the grid phase c according to the circuit state shown in FIG. 4 and connects this throttle $L_C$ to the capacitive center point N of the direct current voltage intermediate circuit 4. The switching elements $S_5$, $S_6$ $L_C$ thus form a circuit with which the intermediate circuit partial voltage $U_{ZK1}$ and $U_{ZK2}$ can be actively balanced during the failure of the grid phase c. Upon failure of the grid phase a or b, corresponding auxiliary switches or commutators can also be provided in the respective strands a and b. By way of example, the two-point topology is shown in FIG. 4. The commutation via the auxiliary switch can also be applied to the three-point topology according to FIG. 1a.

Figure 5A:
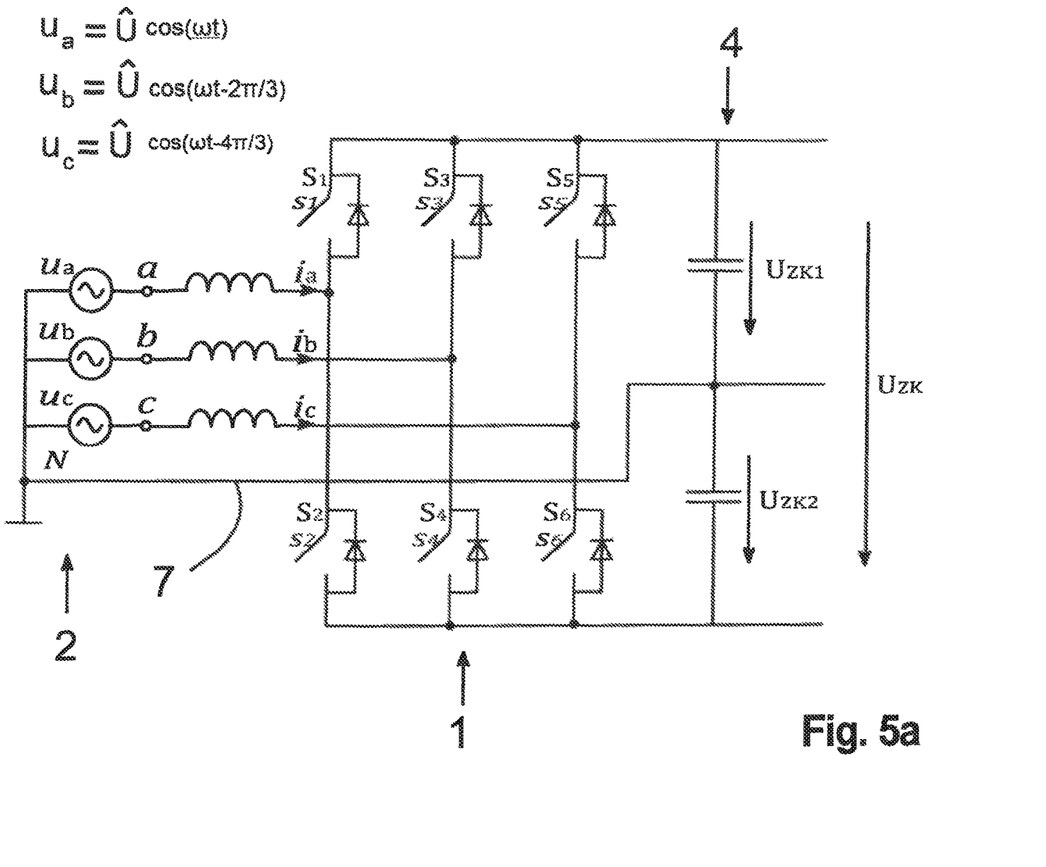
FIG. 5a shows a two-point-circuit of the rectifier with corresponding switching elements for a bidirectional power flow.
Figure 5B:
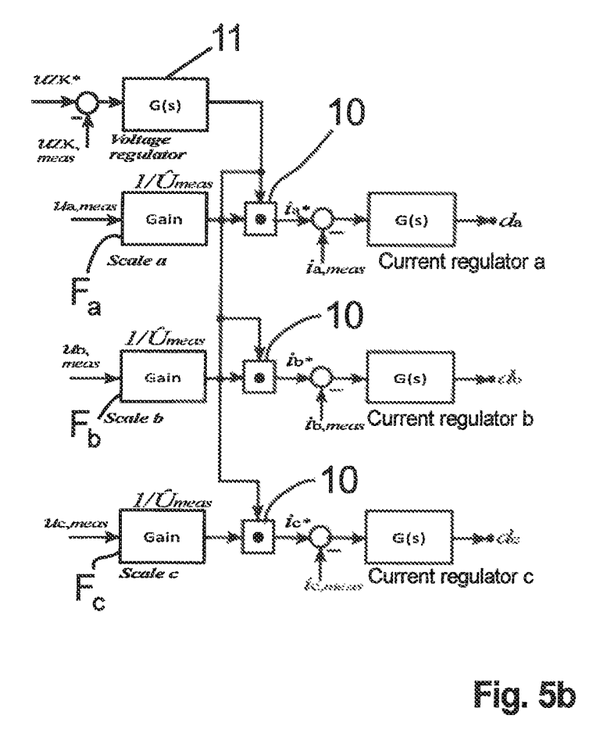
FIG. 5b shows a cascade regulation for generating the driving signals for the switching elements according to FIG. 5a, FIG. 5c shows a representation of the control signals for, on the one hand, a two-point topology and, on the other hand, for a three-point topology of the rectifier.
Figure 5C:
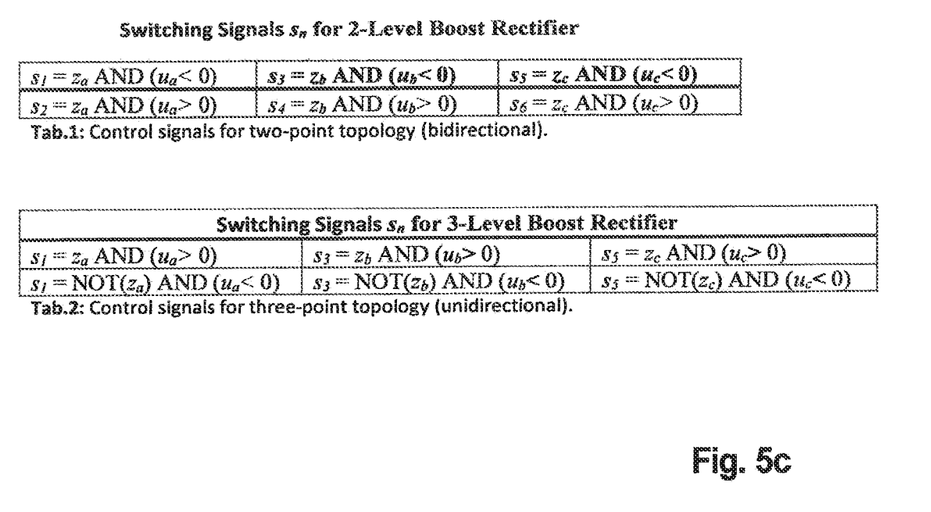

In the FIGS. 5a, 5b and 5c, the driving of the three-phase pulse rectifier 1 and the regulation or the driving of the switching elements is $S_1$, $S_2$, $S_3$, $S_4$, $S_5$, $S_6$ shown. It should be noted that the control signals $S_1$, $S_2$ of the first bridge branch are derived from the first duty cycle signal da, the control signals $S_3$, $S_4$ of the second bridge branch are derived from the duty cycle signal db and the control signals $S_5$, $S_6$ of the third bridge branch are derived from the duty cycle signal dc. It is obvious that the currents $i_a$, $i_b$, $i_c$ flowing through each grid phase a, b, c are regulated independently of each other. Thus, a separate current regulator SRa, SRb, SRc is provided for each phase. For higher-frequency (i.e. grid frequency) current target value formation within a current regulation path, a functional block Fa, Fb, Fb for generating the phase-appropriate, standardized current target values from the current grid phase voltage measurement values are arranged upstream from the three independent current regulators SRa, SRb, SRc. The exits of these functional blocks Fa, Fb, Fc are each guided on the first entrance of a multiplier 10, the second entrance of which is respectively placed at the exit of the common voltage regulator 11. Therefore, the low-frequency current target values (typically 1 to 5 Hz) and the grid frequency, ideally sinusoidal current target values are each multiplicatively linked. The exits of the three multipliers 10 each form the resulting current target value for the three current regulators of the grid phase currents $i_a$, $i_b$, $i_c$.

As is obvious from FIG. 5b, the current regulation underlies the voltage regulation of the intermediate circuit voltage. It is therefore a cascade regulation.

It is understood that the driving according to FIG. 5b is applicable to the three-point topology according to FIG. 1a by means of the Table 2 in FIG. 5c.

Figure 6A:
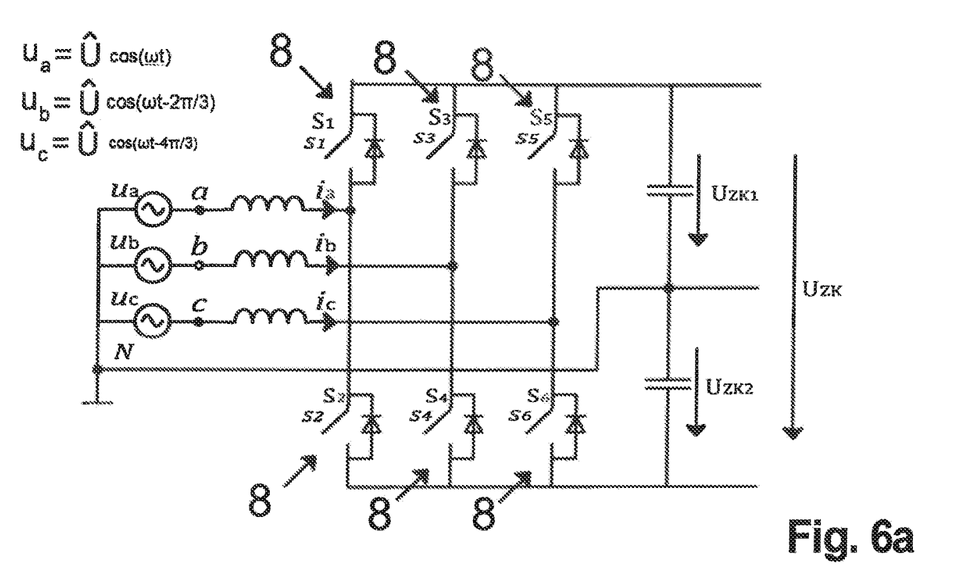
FIG. 6a shows a schematic of the rectifier and the intermediate circuit.
Figure 6B:
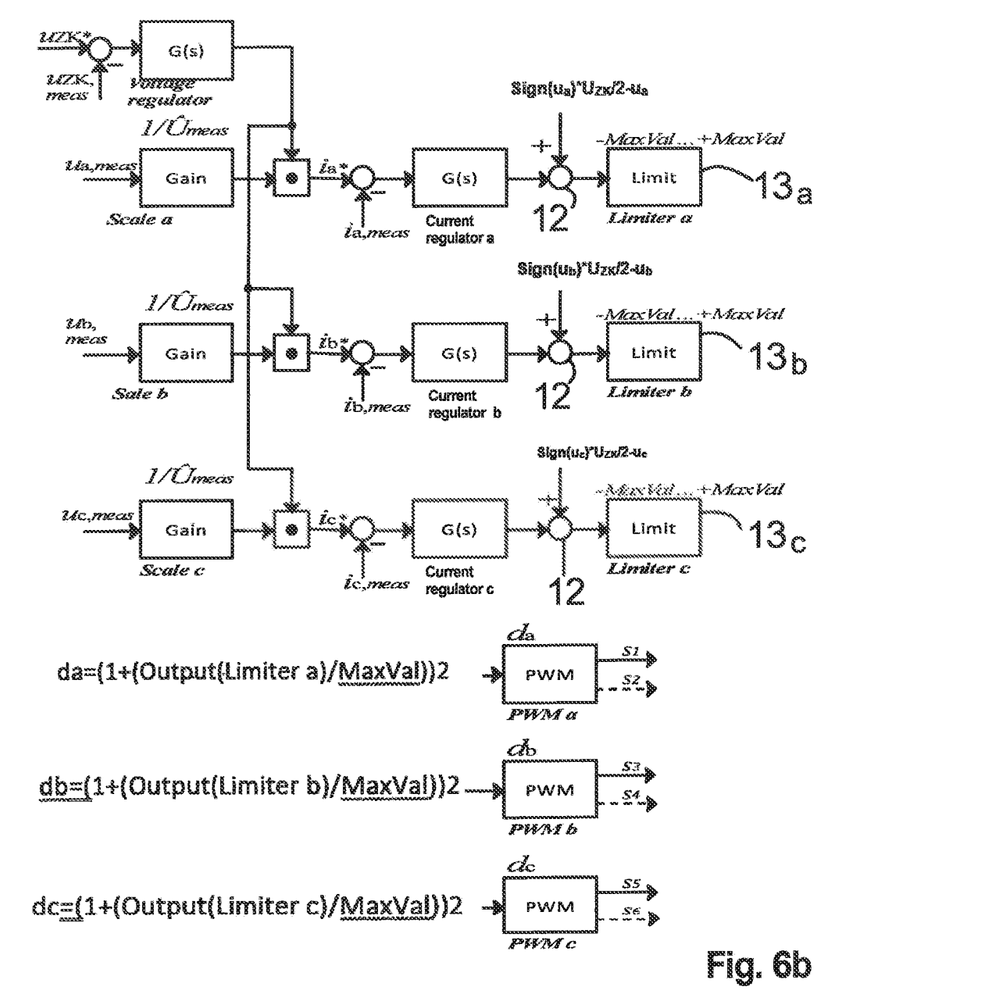
FIG. 6b shows a regulation of the rectifier with duty cycle feedforward.

The driving of the switching elements 8 is comparatively enhanced according to the embodiment according to the FIGS. 6a and 6b. In addition to the driving according to FIG. 5b, summing junctions 12 are arranged downstream from the current regulators for duty cycle feedforward. For duty cycle feedforward, the term SIGNUM $(u_{a,b,c})*U_{ZK}/2-(u_{a,b,c})$ is added to the current regulator exit. Advantageously, a limiting block 13a, 13b, 13c is arranged downstream from the duty cycle feedforward within each current regulation path. The limiting block 13a, 13b, 13c limits the sum of the current regulator exits and the duty cycle feedforward to a predetermined maximum or minimum value. The maximum and minimum values are advantageously used as scaling variables for the following duty cycle calculation from which the control signal $S_1$, $S_2$, or $S_3$, $S_4$, or $S_5$, $S_6$ are then calculated. The driving shown in FIG. 6b can of course not only be implemented for the two-point topology shown in FIG. 6a, but for the three-point topology as well. In this case, only the control signals $S_1$, $S_3$, $S_5$ are used, as is obvious from Table 2 in FIG. 5c.

Figure 7:
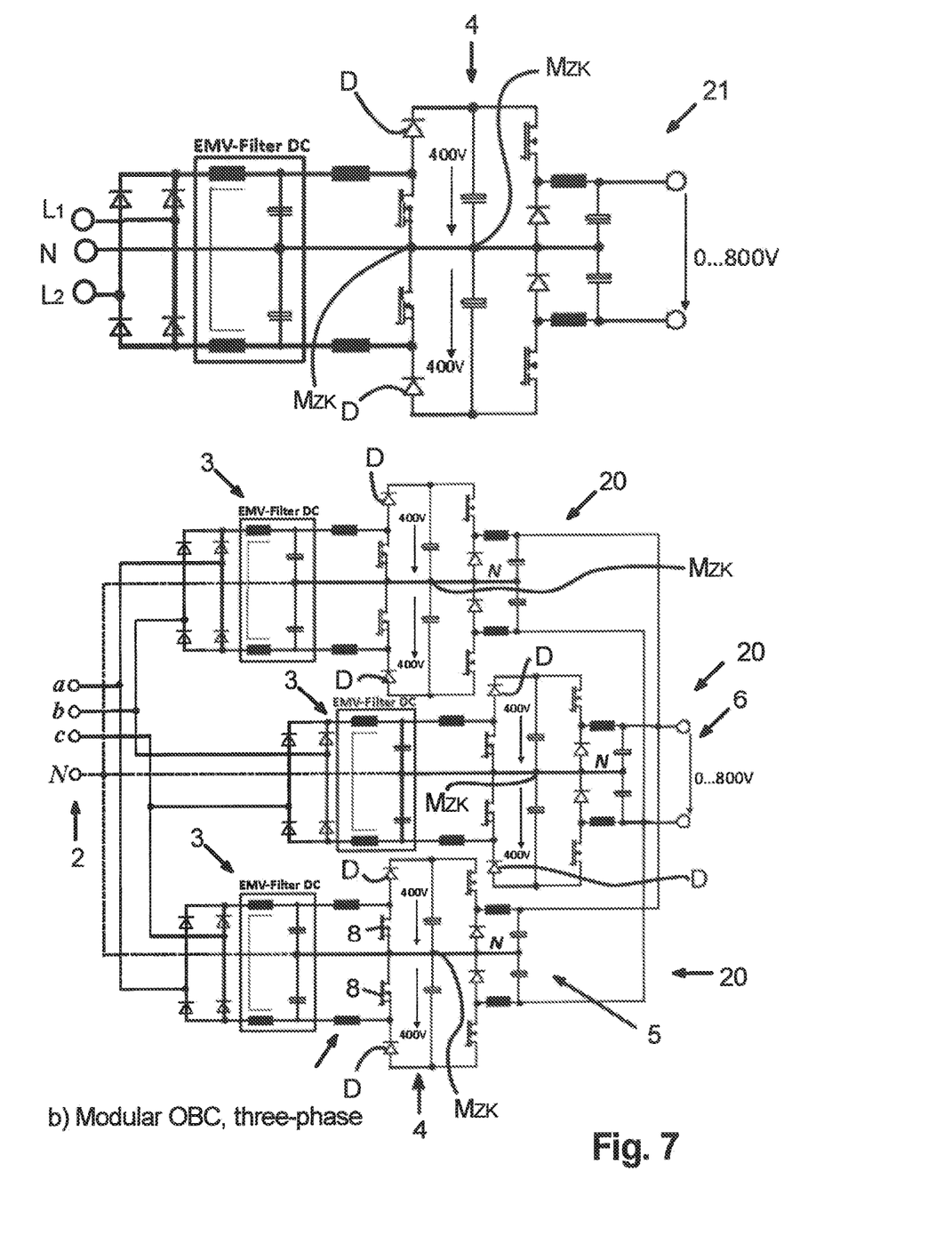
FIG. 7 shows an alternative device according to the invention to FIG. 1a in three-point topology, wherein the device is modularly formed from three identical module segments.

According to an alternative embodiment of a device according to the invention to FIG. 1a corresponding to a unidirectional three-point topology, according to FIG. 7 (lower drawing) a device (charger) consists of three identical module segments 20 which are each associated with two different grid phases a, b, c. The module segments 20 of the three-phase arrangement each correspond to a single-phase module 21 shown at the top of FIG. 7 which is advantageously specifically provided for the North American, US household grid (240 V split phase). As in the exemplary embodiment above, the neutral conductor N of the US household grid, which provides two phases $L_1$ and $L_2$, is directly connected to the center point MZK of the intermediate circuit 4. The two phases $L_1$ and $L_2$ are phase-shifted by 180°. Alternatively, instead of a single module 21, a plurality of modules 21 can be provided which are connected in parallel in order to increase power transmission.

In the lower drawing in FIG. 7, the neutral conductor N of the general, multiphase power grid 2, as is present outside of the US household grid, is directly connected to the center point $M_{ZK}$ of the intermediate circuit 4 of the module segments 20. The center point $M_{ZK}$ of the intermediate circuit 4 is directly connected to the neutral conductor N via a center point of the rectifier 1 (pulse rectifier) and a center point of the filter 3, i.e. there is no electrical structural part between the center point $M_{ZK}$ of the intermediate circuit 4 and the neutral conductor N of the power grid 2. This connection of the center point $M_{ZK}$ of the intermediate circuit 4 of the module segments 20 with the grid phases a, b, c is in each case the same. The module segments 20 are formed identically. Each module segment 20 is connected between two different grid phases of a, b, c, such that each grid phase a, b, c is connected to two different module segments 20. An exit of the module segments 20 is connected to the same battery 6. The thusly formed charger is formed to be modular and not monolithic such that higher power can be transferred. Advantageously, the interactions are reduced upon a phase failure. As power semi-conductor, 600 V types, for example Si MosFET of GaN HEMT, can be implemented. In particular, in deviation from the monolithic topology according to FIG. 1a, the switch diodes D of the rectifier 1 can in this case also be advantageously embodied as 600 V types (in FIG. 1a: 1200 V types are required). This way, the charger is lower in cost and has an improved switch behavior.

The invention claimed is:

1. A device for charging a (fully) electric battery vehicle with a direct current,
    having a rectifier (1) connected to a multiphase power grid (2),
    having an intermediate circuit (4) which is arranged on the charging side of the rectifier (1) and is coupled to the rectifier (1) and has a number of capacitances and a center point ($M_{ZK}$), and
    having a DC/DC converter (5) which is arranged on the charging side of the intermediate circuit (4) and is coupled to the intermediate circuit (4) and is intended to adapt an intermediate circuit voltage ($U_{ZK}$) of the intermediate circuit (4) to a charging voltage ($U_{Batt}$) of a battery (6) of the battery vehicle, wherein the center point ($M_{ZK}$) of the intermediate circuit (4) is connected to a neutral conductor (N) of the multiphase power grid (2),
    wherein the DC/DC converter (5) is formed to be potential bound, and
    wherein the DC/DC converter (5) is
    formed as a buck converter for a unidirectional power flow or is
    formed as a transistor/diode half-bridge branch which is connected in parallel to the intermediate circuit (4) and the half-bridge center point (M) of which is connected to a throttle (S) or is
    formed as two transistor/diode half-bridge branches connected in series, the respective half-bridge center points ($M_1$, $M_2$) of which are each connected to a throttle (S) and wherein a connection point of each of the half-bridge branches is connected to the center point ($M_{ZK}$) of the intermediate circuit (4) or is formed as two buck converters connected antiserially for a unidirectional power flow, the respective half-bridge center points ($M_1$, $M_2$) of which are each connected to a throttle (S) and wherein the two buck converters are each connected to the center point ($M_{ZK}$) of the intermediate circuit (4) at the diode side.

2. The device according to claim 1, wherein the center point ($M_{ZK}$) of the intermediate circuit (4) is directly connected to the neutral conductor (N) of the multiphase power grid (2).

3. The device according to claim 1, wherein a filter (3) is provided which is arranged on the grid current side of the rectifier (1) and is coupled to the same.

4. The device according to claim 3, wherein the filter (3) has a throttle for suppressing remaining common mode currents, wherein the center point ($M_{ZK}$) of the intermediate circuit (4) is connected to the neutral conductor (N) of the multiphase power grid (2) via the throttle.

5. The device according to claim 1, wherein the rectifier (1), the intermediate circuit (4) and the DC/DC converter (5) are arranged in a common structural unit which is installed in the electric battery vehicle or arranged outside of the battery vehicle.

6. The device according to claim 1, wherein the rectifier (1) and the DC/DC converter (5) are designed for a three-phase power grid (2).

7. The device according to claim 1, wherein the rectifier (1) is formed as a pulse rectifier with power factor correction.

8. The device according to claim 7, wherein the three-phase pulse rectifier (1) comprises
a two-point-circuit, preferably for a bidirectional power flow, or
a three-point-circuit, preferably for a unidirectional power flow.

9. The device according to claim 1, wherein an auxiliary switch ($S_{Trans,c}$) is provided by means of which a grid side port of a boost converter ($L_a$, $L_b$, $L_c$) of a phase conductor (a, b, c) of the rectifier (1) is connectable to the neutral conductor (N) such that the phase conductor of the rectifier (1) having the auxiliary switch ($S_{Trans,c}$) can be used for active balancing of the intermediate circuit (4) upon failure of at least one grid phase (a,b,c).

10. The device according to claim 1, wherein identical module segments (20) are connected between two different grid phases (a,b,c), said module segments having the same rectifier (1), the same intermediate circuit (4), and the same DC/DC converter (5), and in that an exit of the module segments (20) is connected to the same battery (6).

11. The device according to claim 1, wherein, at two grid phases ($L_1$, $L_2$) of a grid, in particular of the American Split-Phase 240V grid, which are phase shifted to each other by 180°, only a single module (21) containing the rectifier (1), the intermediate circuit (4), and the DC/DC converter (5) is connected, wherein an exit of the module (21) is connected to the battery (6) and the neutral conductor (N) of said grid is placed at the center point ($M_{ZK}$) of the intermediate circuit (4).

12. The device according to claim 11, wherein several modules (21) are connected in parallel at the entrance and exit sides in order to increase power transmission.

13. A method for charging a (fully) electric battery vehicle with direct current, wherein an alternating current or rotary current provided by a multiphase power grid (2) is rectified, wherein a center point ($M_{ZK}$) of a capacitive intermediate circuit (4) exists, and in that a battery (6) of the (fully) electric battery vehicle is supplied with the rectified alternating current, the potential of the center point ($M_{ZK}$) of the intermediate circuit (4) is placed onto the potential of a neutral conductor (N) of the multiphase power grid (2), wherein the driving signals ($S_1$, $S_2$, $S_3$, $S_4$, $S_5$, $S_6$) for the two-point topology of the rectifier (1) are calculated for driving the switching elements (8) per grid phase (a, b, c) as pulse-width modulated signals ($S_1$, $S_2$, $S_3$, $S_4$, $S_5$, $S_6$) from the duty cycle signals ($d_a$, $d_b$, $d_c$) depending on a positive and a negative grid half-cycle, wherein the driving signals ($S_1$, $S_2$, $S_3$, $S_4$, $S_5$, $S_6$) per bridge branch are determined by using the PWM signal ($Z_a$, $Z_b$, $Z_c$) of the corresponding duty cycle signals ($d_a$, $d_b$, $d_c$).

14. The method according to claim 13, wherein, in special operation, in particular in a single-phase operation at the domestic grid (IEC 61851-1 "Mode 1") or in emergency operation upon phase failure in which only one or two grid phases (a, b, c) can be used, by means of the rectifier (1), in a positive grid half-cycle of the respective current-carrying grid phase (a, b, c), only a first capacitance ($C_1$) of the intermediate circuit (4) is charged and in a negative grid half-cycle of the respective current-carrying grid phase (a, b, c), only a second capacitance ($C_2$) of the intermediate circuit (4) is charged, and in that the DC/DC converter (5) is driven correspondingly to the grid phases (a, b, c) such that a first capacitance ($C_1$) of the intermediate circuit (4) is only discharged via the battery (6) during a positive grid half-cycle and a second capacitance ($C_2$) of the intermediate circuit (4) is only discharged via the battery (6) during a negative grid half-cycle of the same grid phase (a, b, c).

15. The method according to claim 13, wherein the alternating current is rectified by means of a three-phase pulse rectifier (1), wherein switching elements (8) of the pulse rectifier (1) are driven such that the currents ($i_a$, $i_b$, $i_c$) flowing through each grid phase (a, b, c) are regulated independently of each other.

16. The method according to claim 13, wherein the currents ($i_a$, $i_b$, $i_c$) assigned to the grid phase (a, b, c) are regulated depending on a regulation of the intermediate circuit voltage ($U_{ZK}$), wherein target current values are determined by multiplication of measured grid phase voltages ($u_a$, $u_b$, $u_c$) and the exit of the regulator of the intermediate circuit voltage ($U_{ZK}$).

17. The method according to claim 13, wherein, for duty cycle feedforward of the regulated current ($i_a$, $i_b$, $i_c$), a value independent of the intermediate circuit voltage ($U_{ZK}$) and of the grid phase voltage ($u_a$, $u_b$, $u_c$) is added to a value which is limited to a maximum or minimum value by a limiter block (13).

18. The method according to claim 13, wherein the driving signals (S1, S2, S3, S4, S5, S6) for a bidirectional two-point-topology of the rectifier (1) and the driving signals (S1, S3, S5) for the use of a unidirectional three-point-topology of the rectifier (1) are generated by triangular current modulation (TCM) and/or by critical conduction modulation (BM, CrCM) and/or by discontinuous current modulation (DCM).

19. A method for charging a (fully) electric battery vehicle with direct current, wherein an alternating current or rotary current provided by a multiphase power grid (2) is rectified, wherein a center point ($M_{ZK}$) of a capacitive intermediate circuit (4) exists, and in that a battery (6) of the (fully) electric battery vehicle is supplied with the rectified alternating current, the potential of the center point ($M_{ZK}$) of the intermediate circuit (4) is placed onto the potential of a neutral conductor (N) of the multiphase power grid (2), wherein the driving signals ($S_1$, $S_3$, $S_5$) for the three-point topology of the rectifier (1) are calculated for driving the switching elements (8) per grid phase (a, b, c) as pulse-width modulated signals ($S_1$, $S_3$, $S_5$) from the duty cycle signals ($d_a$, $d_b$, $d_c$) depending on a positive and a negative grid half-cycle, wherein the driving signals ($S_1$, $S_3$, $S_5$) per bridge branch are determined by using the PWM signal ($Z_a$, $Z_b$, $Z_c$) of the corresponding duty cycle signals ($d_a$, $d_b$, $d_c$).

\* \* \* \* \*